March 31, 1925.

P. VÉROLA 1,531,462

PULVERIZER WITH PENDULAR ROLLERS

Filed July 10, 1923    3 Sheets-Sheet 1

Inventor
P. Vérola
By Marko & Clerk
Attys.

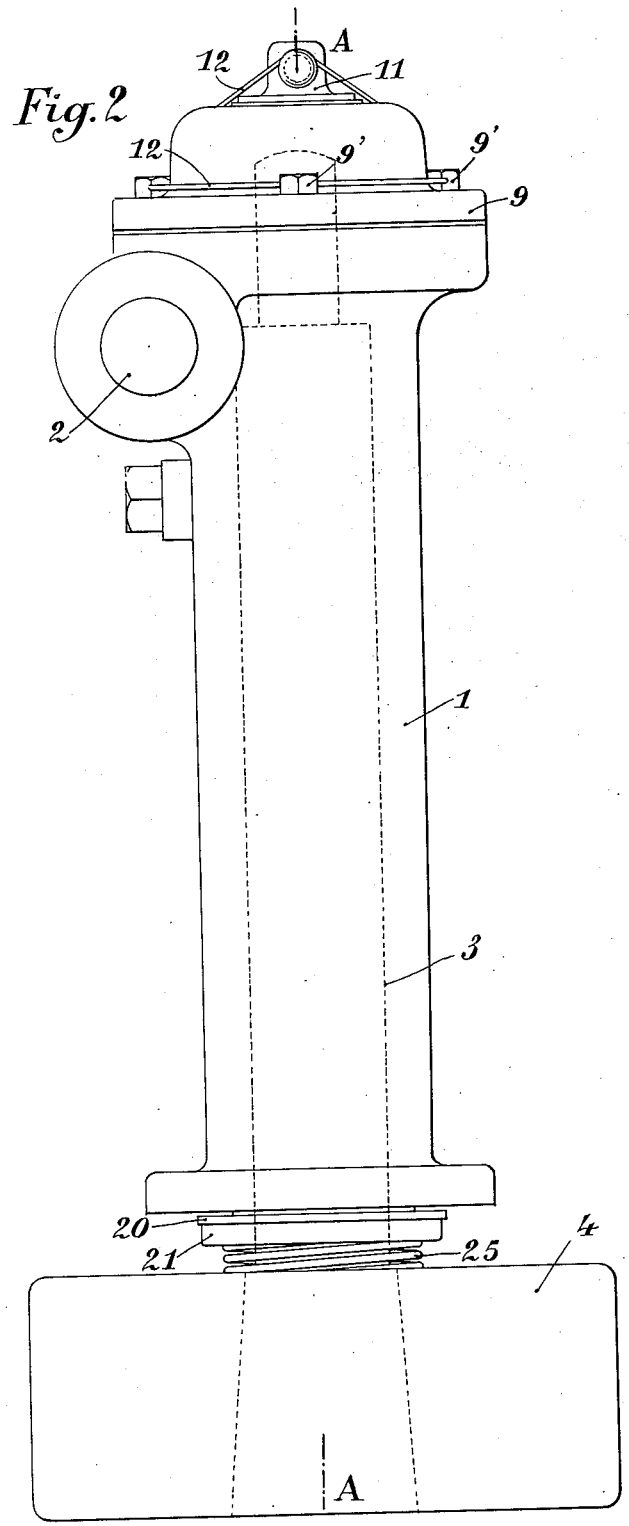

Patented Mar. 31, 1925.

1,531,462

UNITED STATES PATENT OFFICE.

PAUL VÉROLA, OF PARIS, FRANCE, ASSIGNOR TO SOCIETE ANONYME POUR L'UTILISATION DES COMBUSTIBLES, OF PARIS, FRANCE.

PULVERIZER WITH PENDULAR ROLLERS.

Application filed July 10, 1923. Serial No. 650,698.

*To all whom it may concern:*

Be it known that I, PAUL VÉROLA, a citizen of the French Republic, residing at Paris, in the French Republic, have invented new and useful Improvements in Pulverizers with Pendular Rollers, of which the following is a specification.

The pulverizer with pendular rollers is an apparatus which has for its object to grind the substances to be treated, such as coal, phosphates, etc., by crushing these substances between a metallic roller path preferably made of steel and rollers which rotate inside this roller path and are urged against the same by centrifugal force. The apparatus comprises a vertical shaft actuated by pinion gears and provided at the upper part with a roller-carrying disc which participates in the movement of rotation imparted to the shaft.

Rollers are suspended to the roller-carrying disc in such manner that they are driven by the movement of rotation of the shaft of the apparatus and that they are also enabled to oscillate on their axis of suspension in a vertical plane containing the vertical shaft of the apparatus. These pendular rollers constitute the essential elements of the pulverizing apparatus.

The pendular roller is an element which operates in an atmosphere saturated with dust and which absorbs a relatively considerable amount of power with respect to its very small size. For these reasons, the internal bearings of the pendular roller which serve for its suspension in the casing as well as for the rotation, require very special arrangements in order to prevent the wear and to provide for a good lubrication, and the joint between the roller shaft and the casing should be so designed as to prevent dust from entering the bearing.

The present invention has for its object improvements brought to pulverizers with pendular rollers, one of these improvements consisting in rotating the roller shaft in a casing filled with lubricating substance, the said roller shaft being held in bearings lubricated not only at the upper part but also laterally, another improvement consisting in constituting the joint between the casing and the shaft by several rings which are superposed and adjusted alternately upon the shaft and in a socket carried by the casing; these rings adjusted with precision may, however, slide and can be partially drawn along in the movement of rotation of the roller shaft; they are pressed upon one another by a spring which is intended to take up the back lash and which bears at the one end upon the upper face of the roller and at the other end upon a washer, which holds the rings and which, while sliding on the shaft, is drawn by the shaft in its rotary movement.

In the appended drawings which show by way of example a pulverizer with pendular rollers improved according to the invention:

Fig. 2 shows on a larger scale the external view of one of the pendular rollers contained in the pulverizer.

Figure 1:
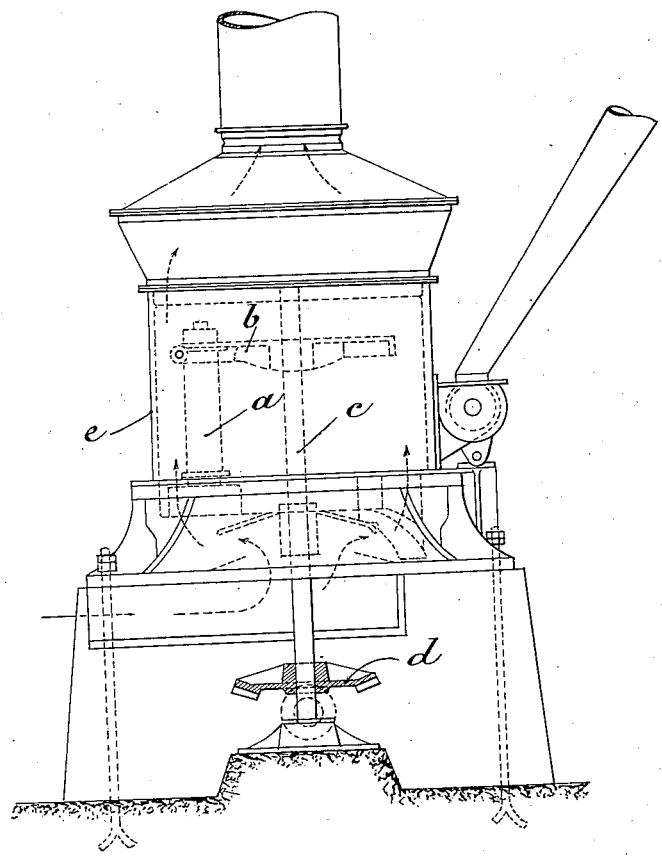
Fig. 1 is a diagrammatic view of the whole pulverizer, a single pendular roller being represented suspended to the roller-carrying disc.

As shown in Fig. 1, the pendular rollers $a$ are suspended to the roller-carrying disc $b$ which is keyed to the shaft $c$ driven by the gearing $d$. The rollers $a$ rotate in a casing $e$ which contains the substance to be pulverized.

Figure 4:
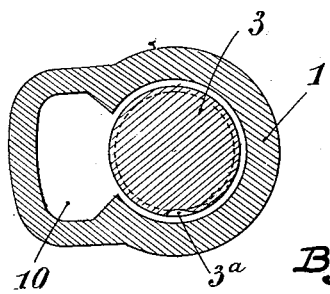
Fig. 4 is the transverse section of the casing and of the roller shaft along the line B—B of Fig. 3.
Figure 3:
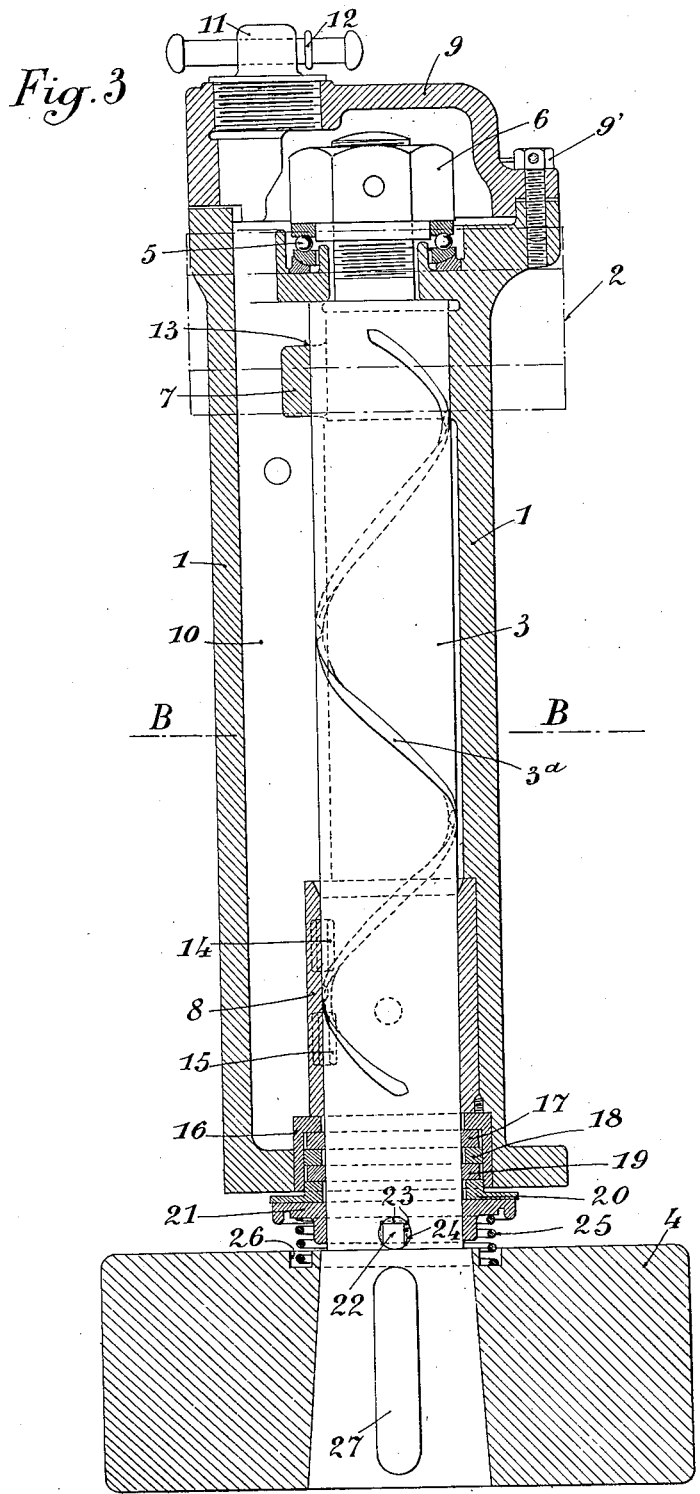
Fig. 3 is the lengthwise section thereof on the line A—A Fig. 2.

Each of the pendular rollers $a$ is constituted according to the invention as shown in Figs. 2, 3, and 4. It comprises a casing 1 having an eyelet 2 in which engages an axle for securing the casing to the roller-carrying disc of the pulverizer. This method of suspension ensures the entraining of the casing in the rotary movement which is imparted to the roller-carrying disc $b$, but leaves it free to oscillate about the axle of the eyelet 2. In the casing is journalled a shaft 3 which is suspended therein. One end of the shaft extends out of the said casing and a roller is keyed to this end. Taking no account of the movement of rotation produced by the roller-carrying disc, the casing 1 is stationary whilst the shaft 3 and roller 4 rotate about the longitudinal axis of the casing.

The roller shaft 3 bears at its upper part upon a ball-bearing 5 through the medium of a nut 6 locked by a pin. This ball-bearing constitutes so to speak a step bearing. The rotary shaft 3, which may be provided with a helical groove $3^a$, rotates on the other hand in the two bearings 7 and 8, the bearing 7 being preferably of cast iron and the bearing 8 of bronze.

The lubrication of the ball-bearing 6 and of the two bearings 7 and 8 is effected in the following manner: The upper cap 9 as well as the lateral sheath 10 of the casing 1 (Figs. 3 and 4) can be filled either with grease through the plug 11, or with oil introduced by a central lubricating device. The plug 11 is held during the working in its position, without any possible unscrewing, by the wire 12 which connects it with the bolts 9' securing the cap 9.

The particular feature of the lubrication of the journals of the shaft is as follows: The lubricating substance, instead of being introduced only through the top, is also supplied laterally to the shaft 3; at 13 for the upper bearing 7 and through the apertures 14 and 15 for the lower bearing 8. It has been ascertained in fact that the normal method of lubrication of the shaft bearings (admission of lubricating substance at the top) caused great drawbacks, in spite of all the arrangements made (oil grooves, etc.) since the lubrication could not take place normally for more than four or five hours continuous work. If one exceeds this duration of work, the lower part, which lacks the lubricating substance, will heat up rapidly and makes it necessary to stop the roller in order to avoid seizing. With the method of lubricating the journals of the shaft 3 which has just been described, these drawbacks are avoided.

The joint between the casing 1 and the roller shaft 3 is made in the following manner: A steel socket 16 is forced into or otherwise secured to the casing. This socket contains a labyrinth joint composed of the sealing rings 17, 18, 19 and 20. The rings 17 and 19 are made preferably of bronze and the rings 18 and 20 are preferably made of steel.

The rings 17 and 19 are closely fitted to the shaft 3 and are partially drawn along by this shaft in its movement of rotation. The rings 18 and 20 are on the contrary adjusted with precision in the socket 16, but can also slide in the same.

The lower floating ring 20 bears upon a spring actuated washer 21 which is drawn along in the rotation of the shaft 3 by the pin 22; however the washer may slide along the shaft, for the pin 22 is provided at its ends with the plane surfaces 23 which guide the slots 24 of the washer 21. The lower surface of the pin also, prevents the lifting of the roller 4 which is secured to the shaft 3 by conical fitting and key 27. The washer 21 is urged by a coil spring 25 which bears upon the roller 4, and is preferably centered within a groove 26 provided in the upper surface of this roller. The spring 25 is moreover not subjected to any effort of torsion, because the roller 4 and the washer 21 are both drawn along in the movement of the shaft 3. The washer 21 thus presses the rings 17, 18, 19, 20 against one another and presses the ring 17 against the socket 16; the spring 25 acts on the washer 21 with a relatively small force which is that which is just sufficient to uphold the rings and to take up the back lash that might occur between them.

The joint thus formed between the casing 1 and shaft 3 which turns at the interior is quite fluidtight and on the one hand it prevents the outlet of lubricating substance which flows between the socket or bearing part 8 and the shaft 3, and on the other hand the admission into the casing of the dust in which is placed the roller 4. In fact, the rings 17 and 19, which fit closely on the shaft 3, will prevent any passage between the part situated above and the part situated below them; further, the dust and the grease which would tend to pass between the socket 16 and the rings 17 and 19 are stopped by the rings 18 and 20 which are fitting in this socket 16.

As above stated, and as it also results from the arrangement of the joint, the rings 17 and 19 participate partially in the movement of rotation of the roller shaft 3, due to the tight fit between these and the shaft. The spring actuated washer 21 keyed to the shaft is drawn along by the rotation of the latter. Since the rings 18 and 20 are fitted with precision into the socket 16 but can nevertheless slide in it, they can be slightly drawn along in the rotation, but at all events, the movements of rotation of the rings 17 and 19 and of the washer 21 with respect to the rings 18 and 20 and to the socket 16 is relatively small, the wear is practically null and a very great fluid tightness is secured.

One may obviously make detail modifications in the construction described without departing from the spirit of the invention.

Having now described my invention what I claim as new and desire to secure by Letters Patent is:

1. In a pulverizer with pendular rollers comprising a rotatable disc to which the roller-shafts are pivotally suspended, a tight casing for each of said roller-shafts forming a lateral sheath for the lubricating substance, means in said casing for supporting the roller-shaft, means in said casing for guiding said roller-shaft and a tight joint between said casing and said roller-shaft comprising a socket carried by the casing, a floating ring adjusted in said socket, a plurality of sealing rings above said floating ring and adjusted alternately in said socket and on the roller-shaft, a washer and a spring adapted to force said washer against said floating ring.

2. In a pulverizer with pendular rollers comprising a rotatable disc to which the roller-shafts are pivotally suspended, a tight casing for each of said roller-shafts forming a lateral sheath for the lubricating substance, means in said casing for supporting the roller-shaft, means in said casing for guiding said roller-shaft and a tight joint between said casing and said roller-shaft comprising a socket carried by the casing, a floating ring adjusted in said socket, a plurality of sealing rings above said floating ring and adjusted alternately in said socket and on the roller-shaft, said rings being adapted to rotate with said shaft and to slide along the same, a washer adapted to be driven by the shaft and to slide along the same and a spring adapted to bear on the roller and to force said washer against said floating ring.

3. In a pulverizer with pendular rollers comprising a rotatable disc to which the roller-shafts are pivotally suspended, a tight casing for each of said roller-shafts forming a lateral sheath for the lubricating substance, means in said casing for supporting the roller-shaft, means in said casing for guiding said roller-shaft and a tight joint between said casing and said roller-shaft, comprising a socket carried by the casing, a floating ring adjusted in said socket, a plurality of sealing rings above said floating ring and adjusted alternately in said socket and on the roller-shaft, said rings being adapted to rotate with said shaft and to slide along the same, a washer, a transverse pin carried by the shaft and adapted to drive said washer in the rotary motion of said shaft and to permit the sliding of said washer along said shaft while also preventing lifting of the roller, and a spring adapted to bear on the upper surface of the roller and to force said washer against said floating ring.

In testimony whereof I have signed my name to this specification.

PAUL VÉROLA.